United States Patent
Ito (10) Patent No.: US 8,321,960 B2
(45) Date of Patent: Nov. 27, 2012

(54) SCANNING PROBE MICROSCOPE (75) Inventor: Takeshi Ito, Otsu (JP)

(73) Assignee: Shimadzu Corporation, Kyoto (JP)

( * ) Notice: Subject to any disclaimer, the term of this patent is extended or adjusted under 35 U.S.C. 154(b) by 308 days.

(21) Appl. No.: 12/864,491

(22) PCT Filed: Jan. 24, 2008

(86) PCT No.: PCT/JP2008/000078
§ 371 (c)(1),
(2), (4) Date: Jul. 23, 2010

(87) PCT Pub. No.: WO2009/093284
PCT Pub. Date: Jul. 30, 2009

(65) Prior Publication Data
US 2011/0113515 A1   May 12, 2011

(51) Int. Cl.
*G01Q 20/02* (2010.01)
(52) U.S. Cl. ............ 850/5; 850/1; 850/3; 850/4; 850/11; 850/19
(58) Field of Classification Search .................. 250/306; 850/1, 4, 5, 6, 8, 10, 11, 19
See application file for complete search history.

(56) References Cited

U.S. PATENT DOCUMENTS

| | | | | |
|---|---|---|---|---|
| 5,294,804 | A * | 3/1994 | Kajimura | 250/559.31 |
| 5,821,409 | A * | 10/1998 | Honma et al. | 73/105 |
| 2004/0155178 | A1 * | 8/2004 | Ito | 250/231.13 |
| 2008/0223117 | A1 * | 9/2008 | Watanabe et al. | 73/105 |

FOREIGN PATENT DOCUMENTS
JP   2005-233669   9/2005
* cited by examiner

*Primary Examiner* — Michael Logie
(74) *Attorney, Agent, or Firm* — DLA Piper LLP (US)

(57) ABSTRACT

A portion of light emitted from a laser source (11) for detecting a displacement of a cantilever (4) is extracted by a half mirror (20) and guided onto a photodetector (21) having a light-receiving surface divided into four sections. When the direction of the emitted light is inclined due to a change in the ambient temperature or other factors, the light spot formed on the light-receiving surface of the photodetector (21) moves. Accordingly, the amount and direction of the inclination of the emission direction can be recognized from the amount and direction of the movement of the light spot. A drive amount calculator (22) calculates a drive amount according to the amount and direction of the inclination, and operates an actuator (23) to rotate the laser source (11) around each of the Y and Z axes. This operation compensates for the inclination of the direction of the emitted light and thereby prevents the inclination from being falsely recognized as an irregularity on the sample surface.

1 Claim, 5 Drawing Sheets

Fig. 8

SCANNING PROBE MICROSCOPE

CROSS-REFERENCE TO THE RELATED APPLICATIONS

This application is a national stage of international application No. PCT/JP2008/000078, filed on Jan. 24, 2008, the entire contents of which are incorporated herein by reference.

TECHNICAL FIELD

The present invention relates to a scanning probe microscope, and more specifically to a scanning probe microscope having a displacement detection means for optically detecting a mechanical displacement of a cantilever provided with a probe.

BACKGROUND ART

The scanning probe microscope (SPM) is a widely known type of apparatus for the surface observation or roughness measurement of metals, semiconductors, ceramics, synthetic resins and other materials. One representative of this type of apparatus is an atomic force microscope (AFM), which measures an interatomic force acting between a probe and the sample surface. The atomic force microscope has several measurement modes, among which a method called a "non-contact mode" or "dynamic mode" has been popularly used in recent years. In this method, a cantilever provided with a probe is vibrated at a frequency near its resonant point. In this state, the force that acts on the probe due to the interaction with a sample surface is converted to a change in the amplitude, phase or frequency of the vibration of the cantilever, and this change is detected.

Figure 5:
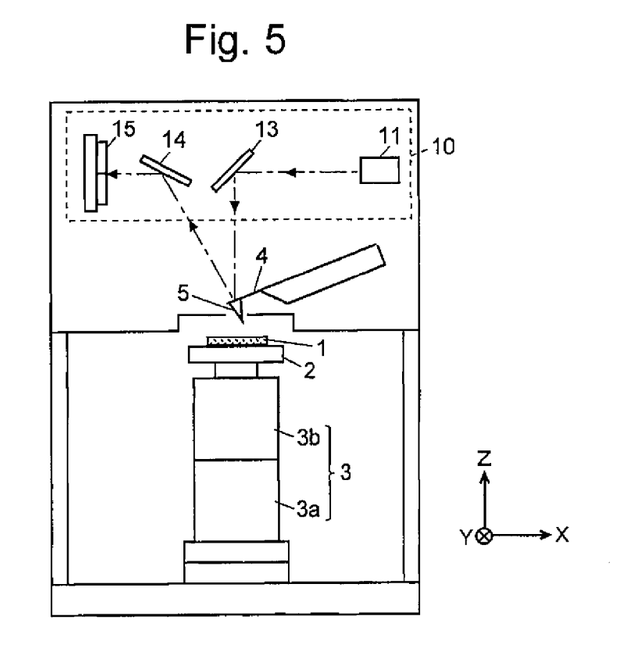
FIG. 5 is a configuration diagram of the main components of a conventional scanning probe microscope.

FIG. 5 is a configuration diagram showing the main components of a conventionally known scanning probe microscope, which is disclosed in Patent Document 1 or other documents. A sample 1 to be observed is held on a sample stage 2 mounted on a substantially cylindrical scanner 3. The scanner 3 includes an X-Y scanner 3a for scanning the sample 1 in the two directions of X and Y axes perpendicular to each other and a Z scanner 3b for slowly moving the sample 1 in the Z-axis direction perpendicular to both X and Y axes. These scanners are each driven by a piezoelectric element which creates a displacement when a voltage is externally applied to it. A cantilever 4 with a probe 5 at its tip is provided above the sample 1. The cantilever 4 is vibrated by an oscillating unit including a piezoelectric element (not shown).

To detect the displacement of the cantilever 4 in the Z-axis direction, an optical displacement detection unit 10, which includes a laser source 11, two mirrors 13 and 14, and a photodetector 15, is provided above the cantilever 4. In the optical displacement detection unit 10, a laser beam emitted from the laser source 11 is reflected by the mirror 13 to a substantially perpendicular direction so that the laser beam is cast on the tip of the cantilever 4. The light reflected from the cantilever 4 is redirected to the photodetector 15 by the mirror 14. The photodetector 15 has a light-receiving surface, which is either divided into a plurality of sections (normally two) arranged in the displacement direction (Z-axis direction) of the cantilever 4, or divided into four sections arranged in the Z-axis and Y-axis directions. A vertical displacement of the cantilever 4 causes a change in the proportion of the light received by each of these light-receiving sections. Accordingly, the amount of the displacement of the cantilever 4 can be calculated by computationally processing the detection signals corresponding to the amounts of light received by those sections.

The non-contact mode measurement operation of the scanning probe microscope having the previously described configuration is briefly explained. The driving unit (not shown) vibrates the cantilever 4 in the Z-axis direction at a frequency near its resonance point. In this state, if an attracting or repelling force acts between the probe 5 and the surface of the sample 1, the vibration amplitude of the cantilever 4 changes. This slight change in the vibration amplitude is detected based on the detection signal of the photodetector 15, and a feedback control of the piezoelectric element of the Z scanner 3b is performed to move the sample 1 in the Z-axis direction so as to cancel the aforementioned change, i.e. so as to maintain the vibration amplitude at a constant value. In this state, when the piezoelectric element of the XY scanner 3a is controlled to scan the sample 1 in the X-Y plane, the amount of the aforementioned feedback control relating to the Z-axis direction will reflect micro-sized irregularities on the surface of the sample 1. By using a signal produced by this operation, a surface image of the sample 1 can be created.

In the scanning probe microscope having the previously described configuration, the emission angle (emission direction) of the laser beam emitted from the laser source 11 may change slightly due to a temperature-dependent change in the characteristics of the laser oscillation circuit or other factors. Such a change in the emission angle of the laser beam causes a problem as hereinafter described.

Figure 6:
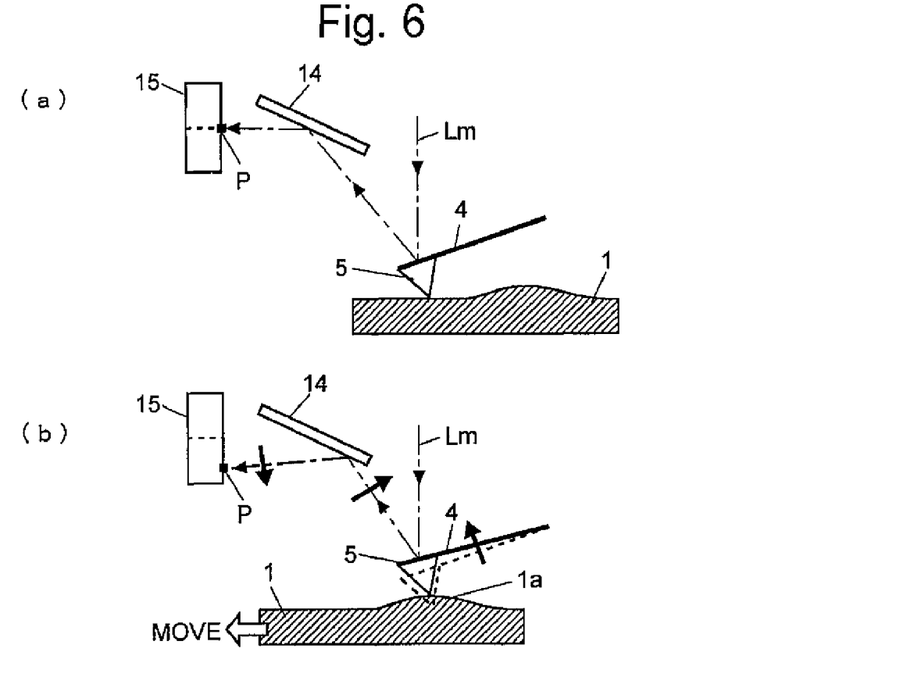
FIG. 6 is a diagram schematically showing the normal operation of an optical displacement detection unit.

FIG. 6 schematically shows a normal operation of the optical displacement detection unit 10. When the probe 5 is scanning a flat region on the sample 1, the light reflected from the cantilever 4 forms a spot at a position P on the light-receiving surface of the photodetector 15, as shown in FIG. 6(a). When the probe 5 reaches a bulge 1a on the sample 1, the cantilever 4 is bent upward, as shown in FIG. 6(b), causing a downward displacement of the spot position P of the reflected light on the light-receiving surface of the photodetector 15. This displacement causes a change in the detection signal from the photodetector 15, from which one can obtain information reflecting the elevation of the bulge 1a or other properties.

Figure 7:
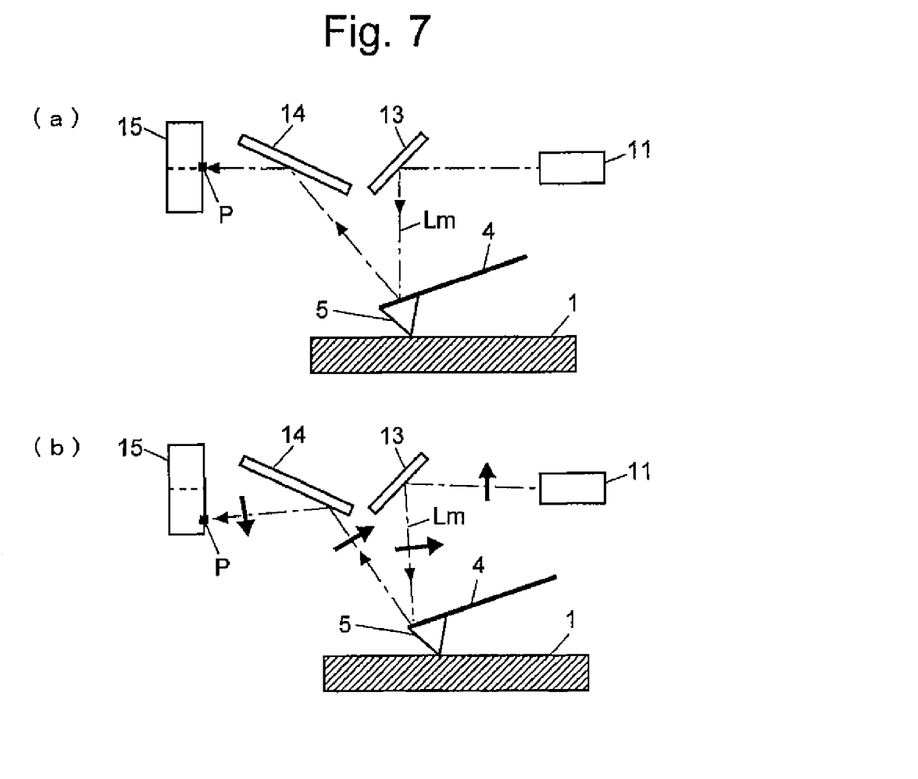
FIG. 7 is a diagram schematically showing an operation in the case where the direction of a laser beam emitted from the laser source is inclined upward.

On the other hand, FIG. 7 schematically shows an operation in the case where the direction of the laser beam emitted from the laser source 11 is inclined upward. As can be seen in FIG. 7(a), when there is no inclination (displacement) of the emission direction of the laser beam (which is normally emitted parallel to the X-axis in the present case), the light reflected from the cantilever 4 forms a spot at a point P on the light-receiving surface of the photodetector 15. This is the same as in the case of FIG. 6(a). In this state, for example, when the emission direction of the laser beam is slightly inclined upward due to a change in the ambient temperature, the incident angle of the illuminating light Lm to the cantilever 4 changes accordingly. Therefore, although the probe 5 is scanning the flat region of the sample 1, the spot position P of the reflected light on the light-receiving surface of the photodetector 15 is displaced downward. That is to say, the light-receiving surface of the photodetector 15 receives light in a manner similar to the case where the bulge 1a is present on the surface of the sample 1 as shown in FIG. 6(b). Thus, if the aforementioned change in the emission direction (emission angle) of the laser beam occurs, the system will falsely recognize it as a concave or convex portion on the surface of the sample 1.

One possible method for preventing such a false recognition is to use a laser source 11 whose emission angle does not significantly change with temperature or other factors. Another possibility is to provide a temperature controller for maintaining the ambient temperature of the laser source 11 at a constant level. However, any of these solutions cannot be implemented without a significant increase in cost. Furthermore, they do not work effectively against a change in the emission angle due to a non-temperature factor, such as an aging variation.

Patent Document 1: Japanese Unexamined Patent Application Publication No. 2005-233669

DISCLOSURE OF THE INVENTION

Problem to be Solved by the Invention

The present invention has been developed to solve the previously described problem, and its objective is to provide a scanning probe microscope capable of preventing a change in the angle of the laser beam emitted from the laser source, from being falsely recognized as an irregularity on a sample surface.

Means for Solving the Problems

The first aspect of the present invention aimed at solving the aforementioned problem is a scanning probe microscope including: a flexible cantilever provided with a probe; a light source for casting an illuminating light on the cantilever; and a photodetector for detecting light reflected from the illuminated cantilever, a displacement of the cantilever being determined based on the position information of the reflected light obtained by the photodetector while the probe is scanning the surface of a sample, and the scanning probe microscope being characterized by including:
 a) a light-splitting means for extracting a separate beam of light on the path of the illuminating light from the light source to the cantilever;
 b) a compensation light-detecting means for detecting an arrival position of the beam of light extracted by the light-splitting means; and
 c) a compensating means for recognizing a change in the emission angle of the light emitted from the light source according to information obtained with the compensation light-detecting means, and for controlling the light source so as to reduce the influence of the aforementioned change on the position information of the reflected light.

The simplest method for the compensating means to control the light source is to change the posture (inclination) of the light source. As a driving source for creating such a change, a piezoelectric element or similar actuator can be used.

The second aspect of the present invention aimed at solving the aforementioned problem is a scanning probe microscope including: a flexible cantilever provided with a probe; a light source for casting an illuminating light on the cantilever; and a photodetector for detecting light reflected from the illuminated cantilever, the displacement of the cantilever being determined based on the position information of the reflected light obtained by the photodetector while the probe is scanning the surface of a sample, and the scanning probe microscope being characterized by including:
 a) a light-splitting means for extracting a separate beam of light on the path of the illuminating light from the light source to the cantilever;
 b) a compensation light-detecting means for detecting an arrival position of the beam of light extracted by the light-splitting means; and
 c) a compensating means for recognizing a change in the emission angle of the light emitted from the light source according to information obtained with the compensation light-detecting means, and for controlling an optical element provided in the aforementioned path of the illuminating light so as to reduce the influence of the aforementioned change on the position information of the reflected light.

For example, the aforementioned optical element may be a lens mechanism including either a single lens or a plurality of lenses assembled together, and the compensating means may control the position, angle and/or other elements of the lens mechanism. Naturally, it is also possible to use an optical element whose optical characteristics are electrically variable.

The third aspect of the present invention aimed at solving the aforementioned problem is a scanning probe microscope including: a flexible cantilever provided with a probe; a light source for casting an illuminating light on the cantilever; and a photodetector for detecting light reflected from the illuminated cantilever, the displacement of the cantilever being determined based on the position information of the reflected light obtained by the photodetector while the probe is scanning the surface of a sample, and the scanning probe microscope being characterized by including:
 a) a light-splitting means for extracting a separate beam of light on the path of the illuminating light from the light source to the cantilever;
 b) a compensation light-detecting means for detecting an arrival position of the beam of light extracted by the light-splitting means;
 c) a moving means for moving at least either the sample or the cantilever so as to change the relative distance between the sample and the cantilever; and
 d) a compensating means for recognizing a change in the emission angle of the light emitted from the light source according to information obtained with the compensation light-detecting means, and for controlling the moving means so as to reduce the influence of the aforementioned change on the position information of the reflected light.

For example, the moving means may be a scanner for moving the sample, using a piezoelectric element as a drive source.

The fourth aspect of the present invention aimed at solving the aforementioned problem is a scanning probe microscope including: a flexible cantilever provided with a probe; a light source for casting an illuminating light on the cantilever; and a photodetector for detecting light reflected from the illuminated cantilever, the displacement of the cantilever being determined based on the position information of the reflected light obtained by the photodetector while the probe is scanning the surface of a sample, and the scanning probe microscope being characterized by including:
 a) a light-splitting means for extracting a separate beam of light on the path of the illuminating light from the light source to the cantilever;
 b) a compensation light-detecting means for detecting an arrival position of the beam of light extracted by the light-splitting means; and
 c) a compensating means for recognizing a change in the emission angle of the light emitted from the light source according to information obtained with the compensation light-detecting means, and for correcting, according to the magnitude of the aforementioned change, either the position information of the reflected light or data reflecting an irregularity or physical property of the sample surface obtained based on the position information.

In the scanning probe microscope according to any of the first through fourth aspects of the present invention, a beam splitter, such as a half mirror, may be used as the light-splitting means. A photodetector, such as a photodiode with a light-receiving surface divided into two, four or any other number of sections, may be used as the compensation light detecting means. For the light source, a laser source is normally used since it is necessary to cast a small spot of light on the cantilever.

If the emission angle (emission direction) of the light emitted from the light source varies due to a change in the ambient temperature or other environmental f actors, the incident angle of the light cast on the cantilever varies accordingly. Simultaneously, on the light-receiving surface of the compensation light-detecting means, the arrival position of the light extracted by the light-splitting means also changes. The amount of this change corresponds to the change in the emission angle. Such a technique for recognizing a change in the emission angle of the light emitted from the light source is common to the first through fourth aspects of the present invention. What differentiates these four aspects from each other is their method for reducing the influence of the change in the emission angle, i.e. in the technical matter relating to the compensating means.

The scanning probe microscopes according to the first and second aspects of the present invention correct the change of the light path due to a change in the emission angle of the light emitted from the light source so as to prevent a shift of the spot position of the reflected light on the light-receiving surface of the photodetector for detecting the displacement of the cantilever. In this case, it is possible to cancel, in almost real time, the influence of the change in the emission angle by a feedback control based on the information obtained with the compensation light-detecting means.

In the scanning probe microscope according to the third aspect of the present invention, when a sample surface is scanned with the probe, the amount of the movement of the moving means, which is feedback-controlled according to the change in the spot position of the reflected light on the light-receiving surface of the photodetector, is varied based on the information obtained with the compensation light-detecting means. Therefore, although the path of the light cast on the cantilever is unchanged, the change in the emission angle of the emitted light does not influence the spot position of the reflected light on the light-receiving surface of the photodetector.

In the scanning probe microscope according to the fourth aspect of the present invention, even if the emission angle of the light emitted from the light source changes, no particular alteration is made to the path of the light cast on the cantilever, the distance between the sample and the cantilever or other configuration elements. Therefore, the change in the emission angle directly appears as a change in the spot position of the reflected light on the light-receiving surface of the photodetector. That is, the position information of the reflected light obtained with the photodetector includes the influence of the change in the emission angle of the emitted light. However, the degree of this influence can be quantitatively known from the information obtained with the compensation light-detection means. Therefore, for example, after the data reflecting the irregularities and/or some physical properties of a sample surface are calculated, the data are corrected according to the amount of the change in the emission angle of the emitted light.

Effect of the Invention

In the scanning probe microscopes according to the first through fourth aspects of the present invention, a change in the emission angle of the light emitted from the light source due to a change in the ambient temperature or other factors will not be falsely recognized as an irregularity on the sample surface. Therefore, it is possible to create a surface image of the sample or measure its surface roughness with high accuracy. As compared to the case of improving the temperature dependency of the emission angle on the light-source side or performing a temperature control for the light source, the cost is more reduced and yet the effect is more reliable. Furthermore, similar effects can also be obtained in the case of a change in the emission angle due to an aging variation or other non-temperature factors.

EXPLANATION OF NUMERALS

1 .... Sample
2 .... Sample Stage
3 .... Scanner
3a ... XY Scanner
3b ... Z Scanner
4 .... Cantilever
5 .... Probe
10 .... Optical Displacement Detection Unit
11 .... Laser Source
14 .... Mirror
15 .... Photodetector
17 .... Drive Unit
20 ... Half Mirror
21 .... Compensation Photodetector
21a, 21b, 21c, 21d .... Light-Receiving Surface
16, 22, 30 .... Drive Amount Calculator
23, 24 .... Actuator
31 .... Adder
40, 41 ... A/D Converter 42 .... Data Processor
43 .... Irregularity Data Calculator
44 .... Emission Angle Data Calculator
45 .... Correction Processor
46 .... Display Unit

BEST MODES FOR CARRYING OUT THE INVENTION

First Embodiment

Figure 1:
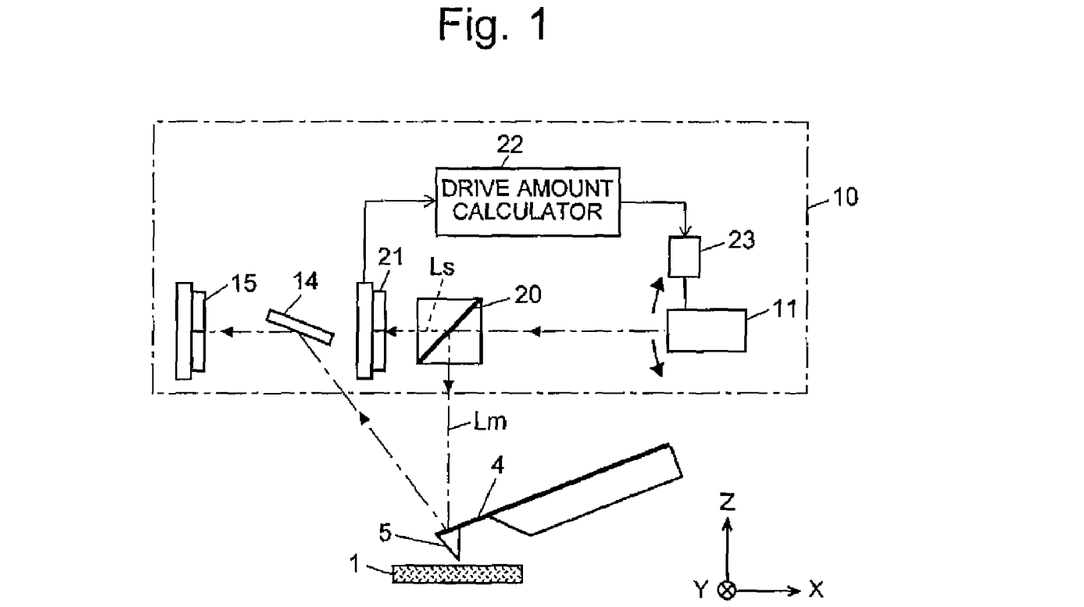
FIG. 1 is a configuration diagram of the main components of a scanning probe microscope according to the first embodiment.

A scanning probe microscope, which is one embodiment of the first aspect of the present invention (the first embodiment), is hereinafter specifically described with reference to the drawings. FIG. 1 is a configuration diagram of the main components of the scanning probe microscope according to the first embodiment. The components that are identical to those already illustrated in FIG. 5 are denoted by the same numerals and will not be specifically described.

Figure 8:
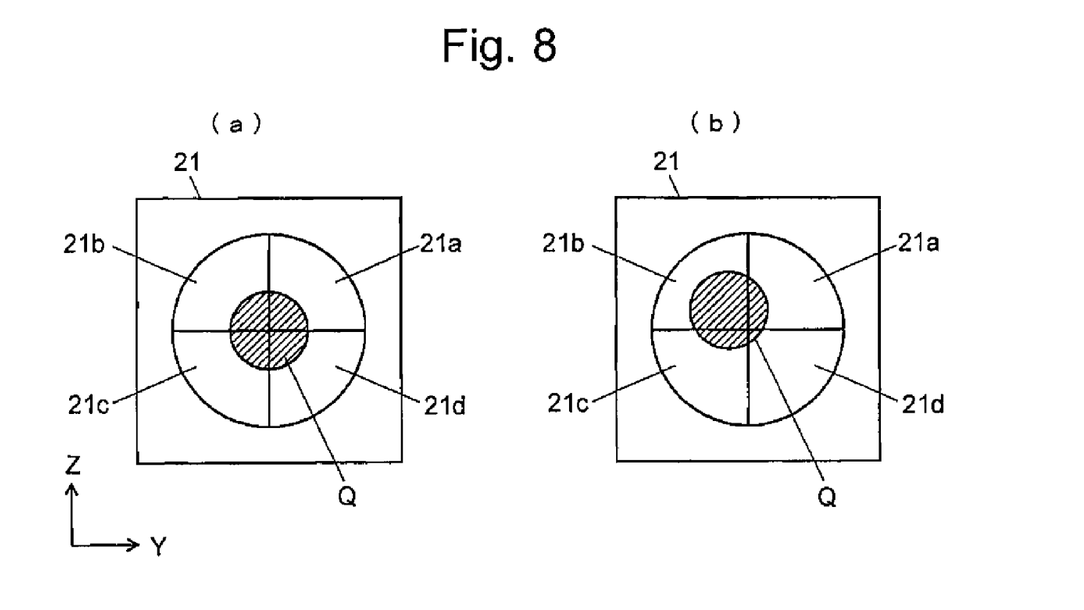
FIG. 8 is a diagram for explaining an operation characteristic of the scanning probe microscopes according to the first through fourth embodiments.

In the present scanning probe microscope, a half mirror 20, which corresponds to the light-splitting means in the present invention, is provided in place of the conventional mirror 13 in the optical displacement detection unit 10. The half mirror 20 splits a beam of light emitted from the laser source 11 into an illuminating light Lm being redirected to the cantilever 4 and a monitoring light Ls. To detect the arrival position of this monitoring light Ls, a photodetector 21, which corresponds to the compensation light-detecting means in the present invention, is provided. This photodetector 21 has a light-receiving surface divided into four sections arranged in the biaxial directions of the Y and Z axes, as shown in FIG. 8. The laser source 11 can be rotated within a predetermined angular range around each of the Y and Z axes by using an actuator 23 including a piezoelectric element and other components. The detection signals from the four light-receiving sections 21a, 21b, 21c and 21d of the photodetector 21 are fed to a drive amount calculator 22, which calculates the drive amounts around each of the Y and Z axes and controls the actuator 23.

Suppose that, when the emission direction of the light emitted from the laser source 11 coincides with the X-axis direction, the spot Q of the monitoring light Ls on the light-receiving surface of the photodetector 21 is at the center of the four light-receiving sections 21a-21d, as shown in FIG. 8(a). In this case, the detection signals respectively obtained at the four light-receiving sections 21a-21d are ideally the same. In such a case, the drive amount calculator 22 sets the drive amount to zero, and the actuator 23 remains inactive.

When the emission direction of the light emitted from the laser source 11 is inclined from the X-axis direction due to a change in the ambient temperature or other factors, the light spot Q formed by the monitoring light Ls changes its position on the light-receiving surface of the photodetector 21, for example as shown in FIG. 8(b). The amount of this movement of the light spot Q corresponds to the magnitude of the inclination of the emission direction of the light, and its moving direction corresponds to the direction of the inclination. Accordingly, the drive amount calculator 22 computationally processes the four detection signals to recognize the magnitude and direction of the inclination of the emission direction of the light, and then calculate the drive amounts that can cancel the inclination. Then, drive signals corresponding to the calculated drive amounts are sent to the actuator 23 to control the displacement of the actuator 23.

Due to the displacement of the actuator 23, the laser source 11 changes its posture, and the direction of the light emitted from the laser source 11 becomes closer to the X-axis direction. As a result, the position of the spot Q of the monitoring light on the light-receiving surface of the photodetector 21 becomes closer to the state of FIG. 8(a). In this state, if a difference from the state of FIG. 8(a) still remains, the drive amount is further corrected so that the light spot Q will be adjusted to the state of FIG. 8(a). By such a feedback control based on the detection signals obtained with the photodetector 21, the direction of the light emitted from the laser source 11 can be made to coincide with the X-axis direction. Thus, the influence of the inclination of the emission direction of the light from the laser source 11 can be solved.

The use of the photodetector 21 with the light-receiving surface divided into four sections in the aforementioned manner makes it possible to detect the inclination of the emitted light in all directions. However, a photodetector 21 with a two-section light-receiving surface may also be used if the inclination is limited to a specific direction due to the characteristics of the laser source 11.

Second Embodiment

Figure 2:
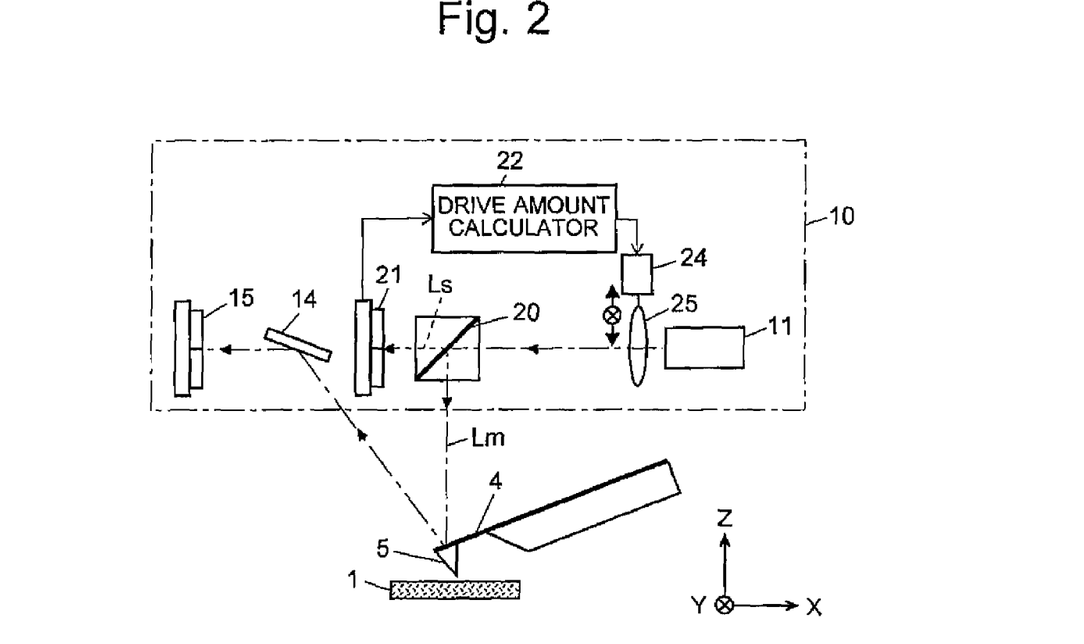
FIG. 2 is a configuration diagram of the main components of a scanning probe microscope according to the second embodiment.

A scanning probe microscope, which is one embodiment of the second aspect of the present invention (the second embodiment), is hereinafter specifically described with reference to the drawings. FIG. 2 is a configuration diagram of the main components of a scanning probe microscope according to the second embodiment. The components that are identical to those already illustrated in FIGS. 1 and 5 are denoted by the same numerals and will not be specifically described.

In the first embodiment, the posture of the laser source 11 was directly controlled to compensate for a displacement (inclination) of the emission direction of the emitted light. By contrast, in the second embodiment, the laser source 11 is fixed, and a lens 25 is provided in the light path between the laser source 11 and the half mirror 20. This lens 25 can be moved in the biaxial directions of the Y and Z axes by an actuator 24. It may be either a single lens or a lens assembly having a plurality of lenses with one or a few of them being movable. In the latter case, if the direction of the light emitted from the laser source 11 is inclined from the X-axis direction, the inclination can be easily corrected so that the light will travel along the X-axis and fall onto the half mirror 20. In addition to moving the lens 25 in the biaxial directions of the Y and Z axes, it is also possible to rotate it as in the first embodiment.

Third Embodiment

Figure 3:
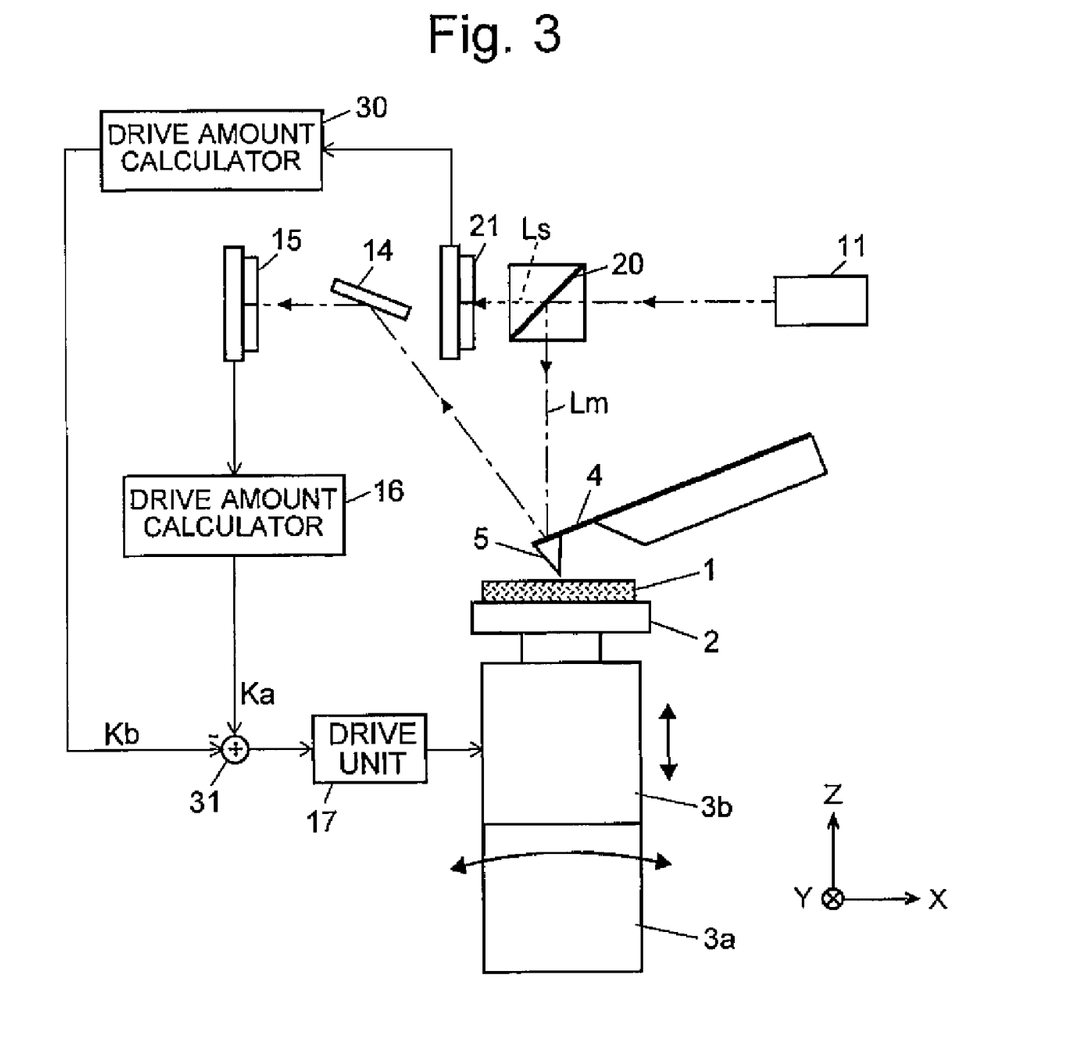
FIG. 3 is a configuration diagram of the main components of a scanning probe microscope according to the third embodiment.

A scanning probe microscope, which is one embodiment of the third aspect of the present invention (the third embodiment), is hereinafter specifically described with reference to the drawings. FIG. 3 is a configuration diagram of the main components of the scanning probe microscope according to the third embodiment. The components that are identical to those already illustrated in FIGS. 1 and 5 are denoted by the same numerals and will not be specifically described.

The drive amount calculator 16 determines a slight change in the vibration amplitude of the cantilever 4 from the detection signals produced by the photodetector 15 and calculates a drive amount Ka for maintaining the amount of the change at zero, i.e. for maintaining the vibration amplitude at a constant value. In the case of a conventional scanning probe microscope, the drive unit 17 performs a feedback control of the piezoelectric element of the Z scanner 3b according to the drive amount Ka so as to move the sample 1 in the Z-axis direction. By contrast, in the scanning probe microscope of the third embodiment, a drive amount calculator 30 calculates the displacement of the emission angle of the emitted light in the Z-axis direction on the basis of the four detection signals of the photodetector 21, and then calculates a compensation drive amount Kb for cancelling the displacement. An adder 31 subtracts the compensation drive amount Kb from the drive amount Ka, and the drive unit 17 drives the piezoelectric element of the Z scanner 3b with a drive amount of Ka−Kb. As a result, the magnitude of the displacement of the sample 1 in the Z-axis direction due to the action of the Z scanner 3b changes so as to reduce the influence of the inclination of the light-emitting direction of the laser source 11.

In the configuration of the present embodiment, although the influence of the inclination of the light-emitting direction of the laser source 11 can be minimized by performing a feedback control similar to the first and second embodiments, the control responsiveness is lower than in the case of the first or second embodiment. However, the change in the light-emitting direction of the laser source 11 normally occurs so gradually that the present method can adequately follow that change.

Fourth Embodiment

Figure 4:
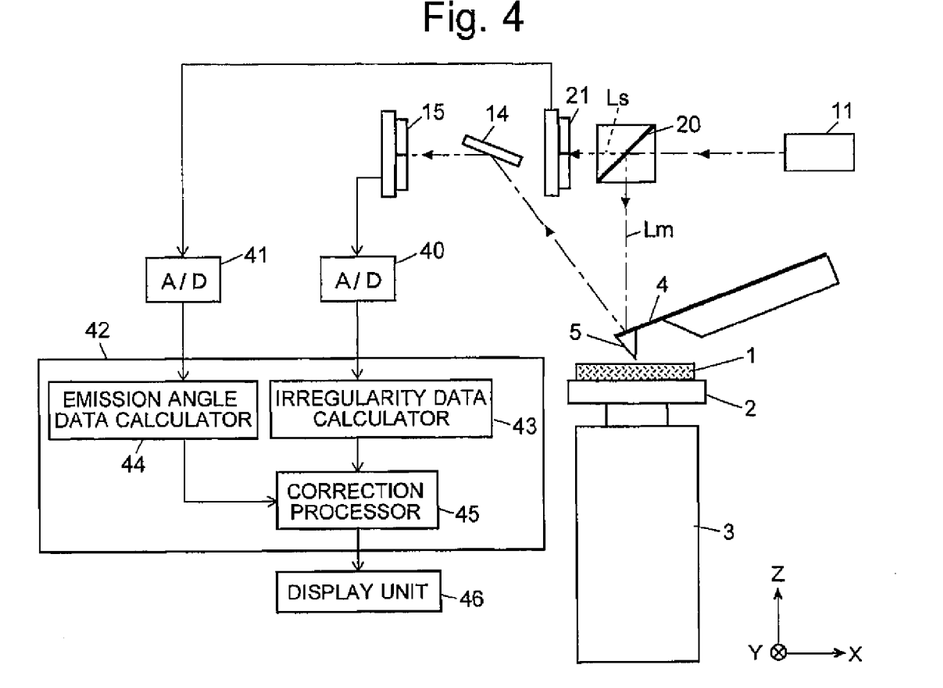
FIG. 4 is a configuration diagram of the main components of a scanning probe microscope according to the fourth embodiment.

A scanning probe microscope, which is one embodiment of the fourth aspect of the present invention (the fourth embodiment), is hereinafter specifically described with reference to the drawings. FIG. 4 is a configuration diagram of the main components of the scanning probe microscope according to the fourth embodiment. The components that are identical to those already illustrated in FIGS. 1 and 5 are denoted by the same numerals and will not be specifically described.

The scanning probe microscope according to the fourth embodiment does not perform the feedback control as described in the first through third embodiments. Instead, it performs a data processing to correct an error corresponding to the change in the direction of the light emitted from the laser source 11. Specifically, the detection signal of the photodetector 15 is converted to digital data by an A/D converter 40 and sent to an irregularity data calculator 43 included in a data processor 42. The irregularity data calculator 43 calculates data that reflects the irregularities on the surface of the sample 1 in a manner similar to the conventional cases. If the direction of the light emitted from the laser source 11 changes, the data will contain an error resulting from that change.

The detection signal of the other photodetector 21 is converted to digital data by an A/D converter 41 and sent to an emission angle data calculator 44 included in the data processor 42. The emission angle data calculator 44 calculates an error data resulting from a change in the direction of the light emitted from the laser source 11. Therefore, as shown in FIG. 8(a), if there is no change in the emission angle, the error data calculated by the emission angle data calculator 44 is zero. A correction processor 45 subtracts the error data from the data obtained with the irregularity data calculator 43. This correction process removes the influence of the fluctuation in the direction of the emitted light. By using the corrected data as the output data, a highly accurate sample surface image is displayed on the display unit 46.

The process of collecting surface irregularity data for one sample takes a considerable length of time. However, as explained earlier, the change in the direction of the light emitted from the laser source 11 is normally slow. Therefore, it is often sufficient to use one representative error data in the correction process rather than calculating the error data for each measurement point of the irregularity data (i.e. one measurement point on the X-Y plane). Naturally, calculating an error data for each measurement point of the irregularity data will result in a higher level of correction accuracy. It is also possible to perform a similar correction on the analogue signals before converting them to digital data.

It should be noted that any of the previously described embodiments is a mere example of the present invention, and any modification, change or addition appropriately made within the spirit of the present invention will be evidently included within the scope of claims of this patent application.

The invention claimed is:

1. A scanning probe microscope including: a flexible cantilever provided with a probe; a light source for casting an illuminating light on the cantilever; and a detector for detecting light reflected from the illuminated cantilever, a displacement of the cantilever being determined based on position information of the reflected light obtained by the detector while the probe is scanning a surface of a sample, and the scanning probe microscope being characterized by comprising:
   a) a light-splitting means for extracting a separate beam of light on a path of the illuminating light from the light source to the cantilever;
   b) a light-detecting means for detecting an arrival position of the beam of light extracted by the light-splitting means; and
   c) a compensating means for recognizing a change in an emission angle of the light emitted from the light source according to information obtained with the light-detecting means, and for correcting, according to a magnitude of the aforementioned change, either the position information of the reflected light or data reflecting an irregularity or physical property of the sample surface obtained based on the position information.

* * * * *